April 20, 1954 R. B. BUCHNER 2,676,286
VOLTAGE COMPARISON DEVICE
Filed July 29, 1949
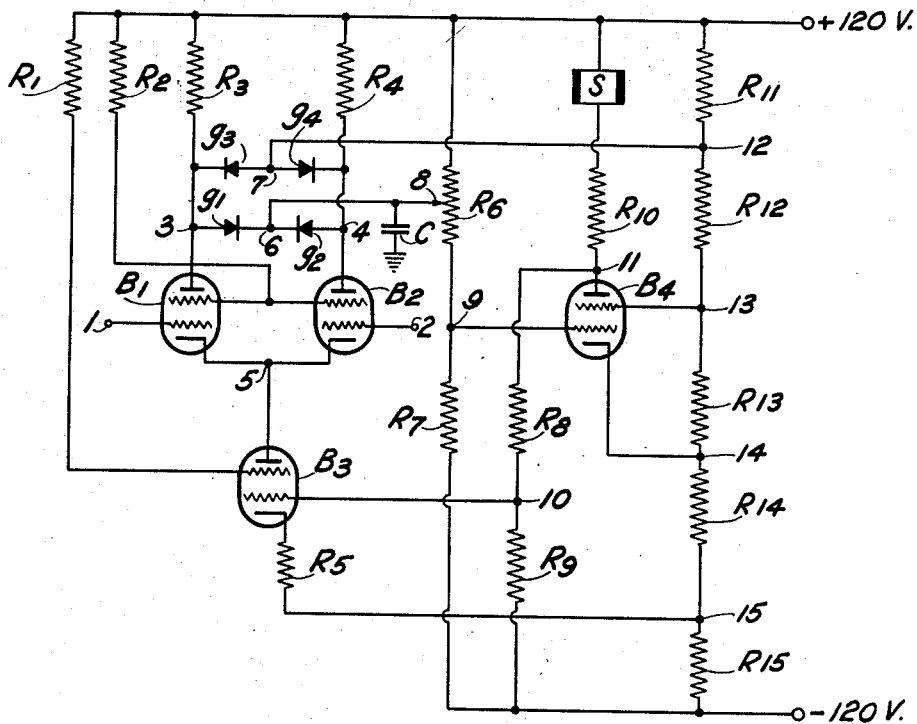
INVENTOR.
ROBERT BERTOLD BUCHNER
BY
AGENT.

Patented Apr. 20, 1954

2,676,286

UNITED STATES PATENT OFFICE 2,676,286

VOLTAGE COMPARISON DEVICE

Robert Bertold Buchner, Eindhoven, Netherlands, assignor to Hartford National Bank and Trust Company, Hartford, Conn., as trustee Application July 29, 1949, Serial No. 107,411

Claims priority, application Netherlands September 10, 1948

8 Claims. (Cl. 317—149)

This invention relates to devices for comparing two potentials, for example for ascertaining the equality of these potentials or for finding out which of these potentials is the higher one.

Such voltage comparison devices are used inter alia in automatic signalling systems, for example automatic telephone systems, in which line finders or selectors are adjusted under the control of a register by means of a voltage comparison method.

A system of this kind is described in the dissertation of Dr. Oberman on "The bridge marker key automatic switching system," The Technical School of Delft, Holland, 1947.

In this system a contact of each outlet of the selector is marked by a direct voltage of a predetermined value by means of a voltage divider constituted by resistances. During the movement of the selector, the voltage comparison device compares the marking potential of the successive outlets with a comparison potential adjusted in the register in accordance with the number to be dialed, which comparison potential is also derived from a voltage divider. When an outlet, the marking potential of which corresponds to the comparison potential in the register, is reached, the voltage comparison device is actuated and, if desired under the control of a relay, the rotary magnet of the selector is demagnetised and the selector stopped.

A voltage comparison device is required to satisfy various conditions. Owing to variation in the values of the resistances used, the voltages to be compared will in practice not be exactly equal in the case of "voltage equilibrium."

Consequently, the device will be required to have a certain threshold such that the device responds if the difference between the potentials to be compared is smaller than a given threshold value. In order to avoid undesired connections being established, the device must not become operative when the voltage difference exceeds the threshold value.

It is desirable that there should be a sharply defined boundary between these two regions. When the threshold value of the voltage difference is exceeded, the current traversing a winding of a relay or stopping magnet to be controlled by the device is required to undergo considerable variation. Furthermore the device is required to be rapidly responsive to prevent a quick-running selector from stopping on a wrong outlet. Furthermore it is of importance that the threshold value is in practice independent both of the value of the comparison voltage, which in the said system may vary, for example, between 0 and —60 volts, and of the values of the supply voltages. The threshold is preferably adjustable.

In order to prevent disturbance of the potentials to be compared, the input resistance of the comparison device is required to have a high value.

The voltage comparison device according to the invention satisfies these requirements and is characterised in that the voltages to be compared are supplied to control electrodes of two discharge tubes, the common cathode circuit of which includes a third discharge tube having a high internal resistance, the anodes of the first two tubes being supplied through resistances and an output circuit of at least one of these tubes being coupled through a rectifier to a control electrode of a fourth discharge tube in such manner that, when the voltage difference decreases at least in one sense and within predetermined limits, the current flowing through the fourth tube decreases, this tube being coupled to the third tube in such manner that the current traversing the third tube increases.

In order that the invention may readily be carried into effect, one example will now be described with reference to the accompanying drawing, which is a schematic circuit diagram.

In the circuit of the accompanying drawing, the voltages to be compared are supplied through points 1 and 2 to the control grids of two discharge tubes $B_1$ and $B_2$. It should be noted at this point that these voltages are each supplied from sources having two terminals, one of which is connected to the negative terminal of the power supply. Thus the voltages are, strictly speaking, not supplied to points 1 and 2 but rather between point 1 and the negative terminal of the power supply and between point 2 and the negative terminal. For purposes of convenience, however, the above terminology will be used. The common cathode circuit of these tubes includes a tube $B_3$ of a high internal resistance, for example a tetrode, the cathode of which is connected through a resistance $R_5$ to the negative terminal of the source of supply. A resistance $R_{15}$, the object of which will be explained more fully hereinafter, must for the time being be imagined to be short-circuited.

The screen grids of $B_3$, $B_1$ and $B_2$ and the anodes of $B_1$ and $B_2$ are supplied through resistances $R_1$, $R_2$, $R_3$ and $R_4$ respectively. Negative feed-back of current occurs due to the presence of resistance $R_5$ in the cathode circuit of $B_3$. If, for example, due to an increase in the potential of the anode of $B_3$ (point 5), the current through $B_3$ increases, the voltage drop at the resistance $R_5$ increases so that the potential of the control grid of $B_3$, which is connected through a resistance $R_9$ to the negative terminal of the source of supply, becomes more negative with respect to the cathode of this tube so that the variation in current is counteracted.

The tube $B_3$ thus constitutes a very high impedance in the common cathode circuit of the tubes $B_1$ and $B_2$, which may be, for example, of the order of magnitude of 10 megohms.

The total emission current of $B_1$ and $B_2$ is thus substantially independent of the value of the voltages to be compared so that in the case of voltage equilibrium between the points 1 and 2 the potentials of the anodes of $B_1$ and $B_2$ are substantially not varied when the potentials of the control grids of $B_1$ and $B_2$ are varied simultaneously between 0 and —60 v.

The resistances $R_3$ and $R_4$ are made equal in this example so that in the case of equality of the potentials of points 1 and 2 the anode potentials of the tubes $B_1$ and $B_2$ are also equal.

However, it is alternatively possible to make the resistances $R_3$ and $R_4$ differ to such extent that the anode potentials are equal for a given potential difference between the control grids.

When the potential of the control grid of $B_2$ is decreased, the current through $B_2$ decreases and the current through $B_1$ increases by an equal amount. The potential of the anode of $B_1$ (point 3) thus decreases and the potential of the anode of $B_2$ increases. Finally, $B_2$ is completely cut-off and the anode current of $B_3$ is wholly led through tube $B_1$.

The anode current of $B_3$ is adjusted in such manner that each of the tubes $B_1$ and $B_2$ can individually carry the full current without drawing grid current so that the device does not constitute a load on the circuit connected to the terminals 1 and 2. In order to prevent undue decrease of the anode voltage of the tube which carries the larger current, and so to prevent the occurrence of various undesired effects, the anodes of $B_1$ and $B_2$ are connected through rectifiers $g_3$ and $g_4$, which may be, for example, selenium cells, to a tap 12 on a voltage divider constituted by resistances $R_{11}$ to $R_{13}$ connected between the terminals of the source of supply.

The rectifiers are connected in such manner that the anode potentials are limited downwards if there is no voltage equilibrium. They are cut-off in the case of voltage equilibrium.

The anodes of $B_1$ and $B_2$ are furthermore connected through the rectifiers $g_1$ and $g_2$ from junction point 6 to a point 8 on a second voltage divider constituted by a potentiometer $R_6$ and a resistance $R_7$. The rest potential of point 6 may be varied by means of potentiometer $R_6$ and adjusted, for example, in such manner that this potential is 15 volts higher than the potential of points 3 and 4 in the case of voltage equilibrium. The rectifiers $g_1$ and $g_2$ are in this case cut-off.

The control grid of a fourth tube $B_4$ is connected to a second tap 9 on the voltage divider $R_6$, $R_7$. The screen grid and the cathode of this tube are connected to suitably chosen taps 13 and 14 on the voltage divider $R_{11}$—$R_{15}$.

So long as the rectifiers $g_1$ and $g_2$ are cut-off, the point 9 is negatively biassed with respect to the cathode of $B_4$ in such manner that this tube is just not current-carrying.

The anode of $B_4$ is supplied from the common source of supply through the resistance $R_{10}$ in series with the winding S of a relay or a stopping magnet. The control grid of tube $B_3$ is connected to a tap 16 of a voltage divider $R_8$—$R_9$, included between the anode of $B_4$ and the negative terminal of the source of supply.

When the current of $B_4$ increases, the potential of the anode (point 11) and also the potential of the control grid of tube $B_3$ (point 16) decrease. The tube $B_3$ is thus coupled to $B_4$ in such manner that, if the current through $B_4$ increases, the current through $B_3$ decreases and conversely. The tap 16 is so chosen that, if $B_4$ conveys a maximum current, the current through tube $B_3$ is not cut-off but is, for example, 20% lower than when $B_4$ is cut-off, since if $B_3$ were cut-off neither tube $B_1$ nor $B_2$ would be current-carrying and the control grids of $B_1$ and $B_2$ would no longer be capable of exerting a controlling action.

As an alternative, the said effect may be obtained by including a common resistance $R_{15}$ in the cathode circuits of the tubes $B_2$ and $B_4$. When the emission current of tube $B_4$ increases, the potential of point 15 with respect to the negative terminal of the source of supply increases. Thus, the potential of the control grid of $B_3$ becomes more negative with respect to the cathode (point 15) and the emission current of $B_3$ decreases.

The circuit-arrangement operates as follows.

When the potential of the inlet 2 decreases with respect to that of point 1, the potential of the anode of tube $B_2$ (point 4) increases. If, conversely, the potential of point 2 increases, the potential of point 3 increases. When the voltage difference between the inlets 1 and 2 exceeds a given limiting value, the potential of point 3 or point 4, according to the sense of the voltage difference, increases above the rest potential of point 6. The rectifier $g_1$ or $g_2$ now becomes conductive so that the potentials of points 6 and 9 are increased. Tube $B_4$ becomes current-conveying and the current through $B_3$ decreases, as above described. Consequently, the currents through tubes $B_1$ and $B_2$ also decrease so that the potential of points 3 and 4 respectively is increased still further and the effect of the voltage difference between the input terminals 1 and 2 is thus intensified. Tube $B_4$ is now fully opened. With a very small increase in the absolute value of the potential difference between the input terminals of the device above a given threshold value, the tube $B_4$ suddenly passes from the non-conductive state into the fully conductive state. The width of the threshold may be varied by displacement of the tap 6 on potentiometer $R_6$.

Apparatus built in accordance with the schematic diagram of the invention was found to operate very satisfactorily when the resistance had the following values:

$R_1 = 10,000^\Omega$ $R_2 = 10,000^\Omega$ $R_3 = 20,000^\Omega$ $R_4 = 20,000^\Omega$ $R_5 = 50,000^\Omega$ $R_6 = 680,000^\Omega$ $R_7 = 500,000^\Omega$ $R_8 = 1,000,000^\Omega$ $R_9 = 33,000^\Omega$ $R_{10} = 12,000^\Omega$ $R_{11} = 2,200^\Omega$ $R_{12} = 100^\Omega$ $R_{13} = 2,200^\Omega$ $R_{14} = 3,900^\Omega$ $R_{15} = 270^\Omega$ When the device is used for adjusting a dialling switch by a voltage comparison method, the voltages to be compared may be derived, for example, from a test brush of the switch and a comparison voltage in a register adjusted in accordance with the number to be dialled.

When the device is switched-on, the stopping magnet S of the switch is connected in the anode circuit of tube B₄. When the switch at this moment is not adjusted on a desired outlet, the voltage difference between the points 1 and 2 so high that B₄ is opened and the stopping magnet is energised. The brushes of the switch move and the device compares the voltages of the successive outlets with the voltage in the register. As soon as a desired outlet is reached, tube B₄ is cut-off and the movement of the switch stops, the process being performed in the opposite sequence from that when the potential difference increases. Owing to the decrease in the potential of points 3 and 4 respectively, the potential of point 9 decreases and tube B₄ becomes current-carrying to a smaller extent. This results in an increase in the potential of point 10 and also an increase in the current through B so that the potentials of the anodes B₁ and B₂ further increase and the process is accelerated.

In this case also the current through tube B₄ and the potentials of several points of the arrangement vary very steeply upon a small variation in the input voltage.

The potential difference between the points 1 and 2 at which the tube B₄ is suddenly cut-off upon decreasing potential difference is, usually somewhat lower than the potential difference at which the tube B₄ is suddenly opened upon increasing potential difference; in other words, the threshold value is not the same upon decrease as it is upon increase.

However, by suitable proportioning it has been found possible to make the difference between the two thresholds very small, for example 25 millivolts. Furthermore, it is possible to make the width of threshold independent of the values of the supply voltages to a first approximation. The width of threshold is determined by the potentials of the points 3 and 4 with voltage equality and the rest potential of point 6. Consequently, it is necessary to ensure that the potential of point 6 varies to the same extent as the potentials of the points 3 and 4 upon variation in supply voltage.

When the variation in supply voltage is $\Delta V$, the variations in the potentials of the points 6 and 10 with respect to the negative terminal of the source of supply, as determined by the positions of the taps on the voltage dividers $R_6$—$R_7$ and $S$, $R_{10}$, $R_8$, $R_9$, may be represented by $m\Delta V$ and $n\Delta V$. The tube B₄ is cut-off and does not affect the potentials.

When the mutual conductance of B₃ is $S_3$ and the resistance $R_{15}$ short-circuited, the variation in the anode current of B₃ may be represented by $$i_3 = \frac{S_3}{1+R_5 S_3} n \Delta V$$

The variation in anode current of each tube is approximately $$\frac{4}{5}$$

of the variation in emission current so that the variation in the potentials of the points 3 and 4 is approximately $$\Delta V_3 = \Delta V - \frac{S_3 R_2}{1+R_5 S_3} \frac{2}{5} n \Delta V$$

This variation is required to be equal to the variation in the potential of point 6, thus:

$$m\Delta V = \Delta V - \frac{S R_3}{1+R_5 S_3} \frac{2}{5} n \Delta V$$

In a practical case this condition is fulfilled, for example, if $$m = \frac{4}{5}, \quad n = \frac{1}{50}, \quad S = 6\,m\text{A}/V, \quad R_3 = 20{,}000\Omega, \quad R_5 = 630\Omega$$

If the potentials of the marking contacts of the switch are not ranged systematically in an increasing or decreasing sense, the potential difference between 1 and 2 may vary from a positive value to a negative when the brush passes from one contact to another. The potential then passes through the value zero although it does so very quickly. Consequently the potential of point 6 drops from a high value to the rest potential and subsequently increases again. Since the arrangement responds extremely rapidly, there is a danger that the selector might be stopped owing to the tube B₄ being cut-off. In order to avoid this difficulty, the point 6 is connected through a condenser C to a point of constant potential, for example to earth, so that the high potential of point 6 is temporarily maintained when the brush passes to a subsequent contact.

In the arrangement shown, the winding S of the relay to be controlled by the device is included in series with resistance $R_{10}$ in the anode circuit of tube B₄. The sudden opening or cutting-off of the tube may give rise to undesired oscillation phenomena in the anode circuit, which may react through the tube B₃ upon the control grid of tube B₄. Furthermore, it is frequently undesirable that the winding of the relay should have a high positive potential with respect to earth.

It is therefore advisable that the winding of the relay or the stopping magnet should be included in an output circuit of a separate tube and that the control voltage of this tube should be derived in a suitable manner, either directly or indirectly, from one point of the arrangement, for example the anode or the control grid of B₄.

The arrangement may be adapted for the investigation which of the two compared potentials is the higher, by removing or switching-off one of the rectifiers $g_1$ and $g_2$, for example $g_1$.

The device then comprises only a single threshold which may be adjusted by displacement of the tap 6 on potentiometer $R_6$ in such manner that, if the potential of point 2 is lower than that of point 1, tube B₄ is current-carrying and is cut-off as soon as point 2 acquires a potential higher than that of point 1. However, it is also possible to adjust point 6 in such manner that the threshold lies at a predetermined positive or negative potential difference between the points 1 and 2.

What I claim is:

1. Apparatus for comparing first and second input potentials to determine their relative magnitudes comprising first, second, third and fourth electron discharge tubes each provided with a cathode, a control electrode and an anode, said third tube having a relative high internal resistance relative to the others, the anode of said third tube being connected to the cathodes of both said first and second tubes, means to apply said first and second input potentials to the respective control electrodes of said first and second tubes, first and second resistances, means to apply a constant voltage between the cathode of said third tube and the anodes of said first and second tubes through said first and second resistances respectively, means including a rectifier for coupling the anode of one of said first and second tubes to the control electrode of said fourth tube to effect a decrease in current through said fourth tube where the difference between said first and second input potentials decreases in a given direction within predetermined limits, and means coupling said fourth tube to said third tube to effect an increase in current in said third tube in response to a decrease in current in said fourth tube.

2. An arrangement, as set forth in claim 1, including a negative feedback resistor interposed between the cathode of said third tube and said constant voltage.

3. Apparatus for comparing first and second input potentials to determine their relative magnitudes comprising first, second, third and fourth electron discharge devices each provided with a cathode, a grid and an anode, said third tube having a relatively high internal resistance relative to the others, the anode of said third tube being connected to both the cathodes of said first and second tubes, means to apply said first and second input potentials to the respective grids of said first and second tubes, first and second resistances, a direct voltage source having its negative terminal connected to the cathode of said third tube and its positive terminal connected through said first and second resistances to the anodes of said first and second tubes respectively, a voltage divider connected across said source, a rectifier connected between the anode of one of said first and second tubes and a predetermined point on said divider, means connecting the grid of said fourth tube to another point on said divider, and means coupling said fourth tube to said third tube to effect an increase in current in said third tube in accordance with a decrease of current in said fourth tube, said predetermined point on said divider providing a voltage thereon relative to the voltage established at the anode to which the rectifier is connected when the input potentials are equal at which said rectifier is non-conductive.

4. Apparatus for comparing first and second input potentials to determine their relative magnitudes comprising first, second, third and fourth electron discharge devices each provided with a cathode, a grid and an anode, said third tube having a relatively high internal resistance relative to the others, the anode of said third tube being connected to both the cathodes of said first and second tubes, means to apply said first and second input potentials to the grids of said first and second tubes, first and second resistances, a direct voltage source having its negative terminal connected to the cathode of said third tube and its positive terminal connected through said first and second resistances to the anodes of said first and second tubes respectively, said fourth tube being connected across a portion of said source, a voltage divider connected across said source, a pair of rectifiers, means connecting the anodes of said first and second tubes through said respective rectifiers to a predetermined point on said divider, means connecting the grid of said fourth tube to another point on said divider, and means coupling said fourth tube to said third tube to effect an increase in current in said third tube in accordance with a decrease of current in said fourth tube, said predetermined point on said divider providing a voltage thereon relative to the voltage established at the anodes of said first and second tubes when the input potentials are equal whereby said rectifiers are non-conductive.

5. An arrangement, as set forth in claim 4, wherein said means coupling said fourth tube to said third tube includes means connecting the anode of said fourth tube to the grid of said third tube.

6. An arrangement, as set forth in claim 4, wherein said means coupling said fourth tube to said third tube including a common resistance element in the cathode circuit of said third and fourth tubes.

7. An arrangement, as set forth in claim 4, further including a second pair of rectifiers, and a second voltage divider connected across said source, a point on said second divider being connected through a respective second rectifier to the anodes of said first and second tubes in a manner limiting the voltage on said anodes when the applied input potentials are different.

8. In an automatic signalling system apparatus for comparing first and second marking potentials to determine their relative magnitudes comprising first, second, third and fourth electron discharge devices each provided with a cathode, a grid and an anode, said third tube having a relatively high internal resistance relative to the others, the anode of said third tube being connected to both the cathodes of said first and second tubes, means to apply said first and second marking potentials to the grids of said first and second tubes, first and second resistances, a relay, a direct voltage source having its negative terminal connected to the cathode of said third tube and its positive terminal connected through said first and second resistances to the anodes of said first and second tubes respectively, means connecting said fourth tube through said relay across a portion of said source, a voltage divider connected across said source, a respective rectifier connected between the anode of each of said first and second tubes and a predetermined point on said divider, means connecting the grid of said fourth tube to another and lower voltage point on said divider, and means coupling said fourth tube to said third tube to effect an increase in current in said third tube in accordance with a decrease of current in said fourth tube, said predetermined point on said divider yielding a voltage relative to that at the anodes of said first and second tubes when the marking potentials are equal such that said rectifiers are non-conductive.

References Cited in the file of this patent

UNITED STATES PATENTS

| Number | Name | Date |
|---|---|---|
| Re. 22,861 | Deakin | Apr. 8, 1947 |
| 2,380,950 | Deakin | Aug. 7, 1945 |
| 2,439,490 | Schell | Apr. 13, 1948 |
| 2,441,568 | Finison | May 18, 1948 |
| 2,454,781 | Deakin | Nov. 30, 1948 |
| 2,482,544 | Jacobsen | Sept. 20, 1949 |
| 2,482,943 | Sepavich | Sept. 27, 1949 |
| 2,529,666 | Sands | Nov. 14, 1950 |

OTHER REFERENCES

Vacuum Tube Amplifiers, Valley and Wallman, page 485, MIT Radiation Lab. Series, McGraw-Hill, published Oct. 1, 1948.